United States Patent
Laugwitz (10) Patent No.: US 12,525,071 B2
(45) Date of Patent: Jan. 13, 2026

(54) METHOD FOR ASSISTED OPERATING SUPPORT OF A GROUND COMPACTION MACHINE AND GROUND COMPACTION MACHINE

(71) Applicant: BOMAG GMBH, Boppard (DE)

(72) Inventor: Niels Laugwitz, Boppard (DE)

(73) Assignee: BOMAG, GMBH, Boppard (DE)

(*) Notice: Subject to any disclaimer, the term of this patent is extended or adjusted under 35 U.S.C. 154(b) by 329 days.

(21) Appl. No.: 18/296,412

(22) Filed: Apr. 6, 2023

(65) Prior Publication Data
US 2023/0326263 A1  Oct. 12, 2023

(30) Foreign Application Priority Data
Apr. 9, 2022  (DE) .................... 10 2022 108 663.1

(51) Int. Cl.
*E01C 19/28* (2006.01)
*G07C 5/06* (2006.01)

(52) U.S. Cl.
CPC .............. *G07C 5/06* (2013.01); *E01C 19/288* (2013.01); *E01C 19/282* (2013.01)

(58) Field of Classification Search
CPC ...... E01C 19/004; E01C 19/26; E01C 19/282; E01C 19/288; G07C 5/06
See application file for complete search history.

(56) References Cited

U.S. PATENT DOCUMENTS 9,139,965 B1 * 9/2015 Frelich .................... E01C 19/26
9,777,443 B2 10/2017 Bornemann et al.
(Continued)

FOREIGN PATENT DOCUMENTS

CN  1774545  5/2006
CN  101289831  10/2008
(Continued)

OTHER PUBLICATIONS

Office Action from related Chinese Appln. No. 202310368696.2, dated Jun. 27, 2025. English machine translation attached.

*Primary Examiner* — Matthew J. Reda
(74) *Attorney, Agent, or Firm* — Grossman, Tucker, Perreault & Pfleger, PLLC (57) ABSTRACT

A method for assisted operating support for a ground compaction machine, comprising the steps of: controlling the ground compaction machine by an operator; detecting at least one of the parameters travel speed, change in travel speed and/or reversal of direction of travel, or at least one variable correlating with one of said parameters; determining a time at which a reversal of the ground compaction machine takes place from the at least one parameter or the at least one variable detected in step b); detecting a steering angle of the ground compaction machine and/or a vibration input of a vibration exciter into the ground, or a variable correlating with the steering angle or with the vibration input, within a time interval and/or a distance around the time determined in step c) and/or around a location of the ground compaction machine at this time; comparing the steering angle and/or vibration input within the interval and/or the distance as detected in step d) with predetermined reference values for a target steering angle and/or a target vibration input; outputting and/or storing a result of the comparison.

14 Claims, 6 Drawing Sheets

(56) References Cited

U.S. PATENT DOCUMENTS

| | | | | |
|---|---|---|---|---|
| 2015/0309006 A1* | 10/2015 | Kangas | ............. | G05B 15/02 |
| | | | | 700/275 |
| 2016/0170415 A1* | 6/2016 | Zahr | ............. | E01C 19/48 |
| | | | | 701/23 |
| 2018/0327023 A1* | 11/2018 | Buschmann | ............. | E01C 19/22 |
| 2019/0078270 A1* | 3/2019 | Laugwitz | ............. | E01C 19/004 |
| 2020/0354902 A1* | 11/2020 | Macdonald | ............. | B06B 1/16 |
| 2022/0064876 A1* | 3/2022 | Fujimoto | ............. | B06B 1/16 |
| 2022/0187842 A1* | 6/2022 | Dai | ............. | E01C 19/288 |
| 2023/0271647 A1* | 8/2023 | Mcclung | ............. | B62D 15/0235 |
| | | | | 701/33.4 |
| 2023/0326263 A1* | 10/2023 | Laugwitz | ............. | E01C 19/26 |
| | | | | 701/33.4 |

FOREIGN PATENT DOCUMENTS

| | | |
|---|---|---|
| CN | 106677032 | 5/2017 |
| CN | 111038582 | 4/2020 |
| DE | 102014201240 | 7/2015 |
| DE | 102018007825 | 4/2020 |
| DE | 102019002442 | 10/2020 |
| JP | 2020-133324 | 8/2020 |

\* cited by examiner

METHOD FOR ASSISTED OPERATING SUPPORT OF A GROUND COMPACTION MACHINE AND GROUND COMPACTION MACHINE

FIELD

The invention relates to a method for assisted operating support of a ground compaction machine. Moreover, the invention relates to a ground compaction machine, in particular a tandem roller or a single-drum roller, with at least one roller drum and a control device.

BACKGROUND

Generic ground compaction machines are known, for example, from applicant's DE 10 2018 007 825 A1. They are typically used in road and pathway construction as well as in the construction of takeoff and landing runways and plazas. They are usually self-propelled machines that have in particular a machine frame supported by a travel mechanism. The travel mechanism typically comprises at least one roller drum and possibly wheels. The travel mechanism may also have two roller drums, for example, which are separated from one another and arranged one behind the other, in particular in the working direction of the ground compaction machine, so that as the ground compaction machine travels forward, a specific position on the underlying ground is successively passed over by both roller drums arranged one behind the other. The working direction of the ground compaction machine in this case corresponds to a longitudinal machine axis or a front/rear direction of the ground compaction machine. The current working direction may be a forward or an opposite backward direction, and the machine is typically operated in a reversing manner. The roller drums are typically metallic hollow cylinders, for example made of steel, which may in particular have a smooth outer circumferential surface. In working operation of the ground compaction machines, the latter are moved with the at least one or the two roller drums over a ground to be compacted, for example an asphalt layer laid by a road paver. The drive energy required to operate the ground compaction machine is typically provided by a drive motor, such as an internal combustion engine, typically a diesel engine, or an electric motor. In order to increase the compaction of the ground by the roller drums beyond the machine's own weight, it is further known to provide a vibration exciter in or on the roller drum, via which the roller drum can be set into vibration. Depending on the type of vibrations, their frequency and their amplitude, the compaction of the roller drum can be adjusted as desired.

Such ground compaction machines typically have an operator platform from which the ground compaction machine is controlled by the operator. In particular, the operator controls the travel of the ground compaction machine over the ground to be compacted. For example, the operator specifies both the direction of travel and the travel speed. At the same time, the operator typically controls the operation of the vibration exciter(s) in the roller drum(s). These can be switched on and off and partly varied with regard to their frequency and/or amplitude. Generic ground compaction machines typically include a control device, which may be, for example, an on-board computer or part of an on-board computer. The control device is typically equipped with at least one sensor that detects at least one parameter of the operation of the ground compaction machine. Such a parameter may be the direction of travel, the travel speed, the steering angle, the operating condition of one or more vibration exciters, an acceleration value, a value associated with ground stiffness, a travel path, etc. Moreover, generic ground compaction machines typically include a display device, such as a screen or display, connected to the control device. The display may, for example, show the values measured by the sensor. In addition, the control device may be configured to receive control commands from the operator—for example, also via the display device, which may comprise a touch screen, additional and/or separate input devices, etc.—and to control the ground compaction machine based on these control commands.

Ground compaction machines are typically guided multiple times over an area to be compacted. This usually requires reversing the ground compaction machine several times. In other words, the direction of travel is reversed several times so that the ground compaction machine travels back and forth on the ground to be compacted. One and the same spot can thus be passed over several times by the ground compaction machine. The purpose of operation of ground compaction machines is regularly to produce and leave a ground surface which is as smooth as possible and at the same time homogeneously compacted. For example, the evenness of a roadway is an essential criterion relevant to remuneration, which is therefore of great practical and economic interest.

However, when the underlying ground is still deformable by the machine's own weight, for example when the asphalt temperature is still comparatively high, the roller drums will inevitably leave a corrugation in the surface to be compacted when reversing, i.e. when reversing the direction of travel. This surface corrugation must then typically be smoothened out as much as possible during subsequent passes to produce a road surface of a desired quality. To facilitate this, ground compaction machine operators are typically required to turn the steering just before the ground compaction machine comes to a stop during reversing, so that the roller drums, and thus also the corrugation created by them during reversing are oblique to the working direction. Such oblique corrugations can be smoothened out much more easily and quickly during subsequent passes than corrugations that extend perpendicular to the working direction.

In addition, the operator of the ground compaction machine typically must be careful to control the operation of the vibration exciter(s) such that an introduction of too much vibration energy at a given point or too many pulses per defined distance into the ground, for example the asphalt layer, is avoided. This can likewise promote the creation of undesired surface corrugations. It is therefore necessary to reduce the vibration input into the ground in good time before or during braking of the ground compaction machine before reversing, for example by switching off the vibration exciter in good time while the ground compaction machine is still moving sufficiently fast.

Overall, the operator can therefore actively influence the waviness or evenness of the compacted ground left by the machine and thus the quality of the work result by the way in which he controls the ground compaction machine. However, to achieve high-quality work results, a considerable amount of experience and skill on the part of the operator is required. Therefore, situations often arise where operators with sufficient training are not available, so that, due to a lack of expertise, the ground compaction machine is not used in such a way that optimum evenness of the compacted ground, for example the roadway, is achieved. In addition, the operator cannot usually see the achieved evenness during working operation. Measuring the evenness of the ground during the working process is technically complex and is therefore typically not carried out. There is therefore no possibility for the operator to adjust his driving based on the currently or most recently achieved result, ideally during operation.

SUMMARY

Against this background, it is the object of the present invention to provide a method or a ground compaction machine with which the evenness of the compacted ground can be improved. In particular, driving errors that may occur in connection with the reversal of the ground compaction machine are to be reduced. Preferably, feedback on the work result should be provided during and/or after compaction operation without the need to measure the evenness of the ground. The feedback on the past work process should enable future work processes to be improved with regard to optimum evenness of the compacted ground.

The object is achieved with a method and a ground compaction machine according to the independent claims. Preferred embodiments are cited in the dependent claims.

Specifically, the object is achieved with a method for assisted operating support of a ground compaction machine. In other words, provided is a method for controlling the compaction process during compaction operation of the ground compaction machine, or a method for monitoring the operator's operation of the ground compaction machine during compaction operation. The method is based on an operator controlling the ground compaction machine. This is done in a manner known per se via input of corresponding control commands, for example with regard to a direction of travel, a travel speed, activation and/or adjustment of one or more vibration exciters, etc. Therefore, a conventional working operation of a generic ground compaction machine is performed, in which the latter is guided by the operator over the ground to be compacted. The ground to be compacted is in particular an asphalt layer laid by a road paver, which is still hot or sufficiently warm for surface deformation by the ground compaction machine, and which is to be compacted so as to form, for example, a roadway or the like. Controlling the ground compaction machine therefore in particular comprises passing over the ground to be compacted multiple times, i.e., reversing the ground compaction machine multiple times. During this process, the ground compaction machine is preferably repeatedly decelerated, in particular to a standstill, and then accelerated again in a direction opposite to the original direction of travel. In this case, it is preferred that at least one roller drum of the ground compaction machine is at least partially set into vibration by a vibration exciter in order to achieve dynamic ground compaction. The vibrations may include, for example, vibratory or oscillatory vibrations or any superposition of these. In the present context, controlling the ground compaction machine by an operator is also understood to mean, in particular, partially autonomous operation. For example, an automatic reversing function could be used in which an operator triggers a reversing operation via a control input, for example a keystroke, wherein decelerating, reducing the vibration input, accelerating in the opposite direction and subsequently increasing the vibration input are performed automatically by the control device. The operator can start the automatic reversing function, for example, at his own discretion or, for example, after reaching a mark, for example, a light spot projected onto the ground, which can be located at a fixed distance necessary for the reversing operation before the reversing point. It is important, however, that the operator naturally retains sovereignty over the control of the machine and can intervene in the process at any time, which immediately terminates the automatic reversing function and allows the operator to take full control of the machine. In particular these cases, in which the operator takes control again are of interest for the method according to the invention, since the automatic reversing function already considers optimal driving. For this reason, the automatic reversing function is particularly preferably configured such that it only controls the decelerating and subsequent accelerating in the opposite direction of travel, in particular up to a desired target speed, but does not take over steering operations, which preferably have to be controlled exclusively manually.

The method according to the invention then includes detecting at least one of the parameters travel speed, change in travel speed and/or reversal of direction of travel. Alternatively, another variable may be detected which correlates with one of the mentioned parameters. For this purpose, the ground compaction machine preferably comprises at least one suitable detection device, for example at least one sensor, which directly or indirectly detects the respective parameter(s) or the respective variable and in particular forwards them to the control device. Throughout the present description, the detecting and determining of various parameters, variables, times or locations may preferably also comprise storing the detected or determined values for later use, for example in a memory, in particular an electronic memory, of the control device. Generally, the detection device may be provided with one sensor which detects several parameters or variables, or a separate sensor may be provided for each parameter or variable. Since ground compaction machines usually already determine the travel speed directly or indirectly, the value of this parameter, for example, is usually already available and can be used for the method according to the invention. The change in travel speed, in turn, may also be determined computationally from a repeatedly or continuously measured travel speed. In addition, it is also possible to monitor the movement or acceleration of the ground compaction machine, for example, via an electronic compass or an IMU (inertial measurement unit). Using GNSSs (global navigation satellite systems) for repeated or continuous detection of the location of the ground compaction machine and/or their temporal comparison is also possible. In addition, the movement of the ground compaction machine may also be determined via optical detection of its surroundings. For example, a camera or the image from a camera can be used to infer the movement of the ground compaction machine. The mentioned variables which are not directly the travel speed, the change in travel speed and/or a reversal of direction of travel can preferably be used to infer these latter. Alternatively, the mentioned variables may be used directly in the next step of the method.

The at least one detected parameter or the at least one detected variable is then used to determine a time at which a reversal of the ground compaction machine will take place. In other words, the reversing point of the ground compaction machine is determined. It is therefore preferably determined when the direction of travel will be reversed or when a travel speed will first drop to zero and then increase again in the opposite direction. This is referred to herein as reversing the ground compaction machine. If the position of the ground compaction machine is also detected, for example by distance measurement or a GNSS, the location of the ground compaction machine at the time when reversing will take place is also known. Therefore, this location can also be used as a starting point for the further method.

Optimally, there is no more vibration input by the exciter unit into the ground, i.e., no more vibration or oscillation energy is transmitted to the ground, below a certain travel speed of the ground compaction machine and in particular when the machine is at a standstill. Such point compaction by the vibrations can otherwise quickly lead to excessive formation of corrugations. Ground compaction machine operators are therefore required to reduce the vibration input into the ground in good time before the machine comes to a standstill during reversing, in particular to zero. To achieve this, the vibration exciter may be switched off, for example, or the amplitude of the generated vibration is reduced, in particular to zero, for example by turning the amplitude to the horizontal. When the exciter is switched off, it typically goes through a resonance range in which the amplitude of the generated vibrations increases. In particular when passing through the resonance range, a sufficiently high travel speed of the ground compaction machine must therefore still be ensured. In addition, as already explained at the beginning, the steering is to be turned before the machine comes to a standstill so that the corrugation inevitably left behind in the ground during reversing is oblique to the straight-ahead working direction. The method according to the invention therefore includes detecting a steering angle of the ground compaction machine and/or a vibration input of a vibration exciter to the ground, or a variable correlating with the steering angle or with the vibration input. For this purpose, too, one or more sensors may be provided on the ground compaction machine as part of the detection device, which detect the respective parameters or variables and forward their values to the control device. For example, a sensor may be provided that detects the steering angle or the vibration input directly or indirectly via a correlating parameter. Using a repeated or continuous measurement of the location of the ground compaction machine and the distance traveled, an oblique orientation of the ground compaction machine can be inferred, which in turn correlates with the steering angle. Alternatively, the braking distance traveled and the steering movement performed in the process can be used to infer the oblique orientation of the ground compaction machine. The vibration input is a measure of how much energy is transferred from the vibration exciter to the ground. This depends largely on the frequency and amplitude of the vibration exciter, which regularly includes one or more imbalance exciters. Accordingly, the vibration input can be influenced by adjusting the frequency and/or amplitude of the vibration exciter. Switching off the vibration exciter, for example, causes the frequency to decrease, in particular down to zero. Additionally or alternatively, the amplitude of the vibration exciter can be adjusted, in particular down to zero, for example, by changing the eccentricity of the imbalance masses of the vibration exciter. This can likewise be used to change the vibration input into the ground. Variables correlating with the vibration input are therefore, for example, the frequency and/or the amplitude and/or the eccentricity of the imbalance masses of the vibration exciter. It is also particularly preferred to use the so-called IPF (impacts per foot) value for this purpose, which indicates how often a vibration exciter acts on the ground in a specific route segment. Details of the IPF value can be found, for example, in applicant's DE 10 2018 007 825 A1. In particular, the amplitude in the present case refers to the vibration component directed in the vertical direction.

Additionally or alternatively, the amplitude of the vibration component directed in the horizontal direction can also be taken into account.

As explained at the beginning, the control of the ground compaction machine during reversing or in connection with reversing is of particular importance for the evenness of the compacted ground. Thus, the control of the ground compaction machine both before reversing as well as after reversing is of interest here. According to the invention, the steering angle and/or the vibration input or the variables correlating therewith are therefore detected within a time interval and/or within a distance around the already determined time of reversing and/or around the already determined location of the ground compaction machine at this time. Therefore, the parameters or variables mentioned are detected before and after reversing. The steering angle and/or the vibration input or variables correlating therewith are therefore linked, depending on which measurements are carried out, in terms of time or location with the likewise determined parameters travel speed, change in travel speed and/or reversal of direction of travel or the variables correlating therewith. For example, a respective steering angle and/or vibration input is detected together with a respective travel speed of the ground compaction machine. The interval and/or the distance can be chosen arbitrarily and may, for example, cover the entire work operation or the entire construction site of the ground compaction machine. What is important is that they include the discussed reversing operation of the ground compaction machine. Preferred more specific intervals/distances are discussed in further detail below.

A key point of the method according to the invention is comparing the detected or determined steering angle and/or vibration input within the interval and/or the distance with predetermined reference values for a target steering angle and/or a target vibration input. As mentioned at the beginning, it is known that corrugations in the ground still to be compacted, which are oblique to the working direction and occur during reversing, can be better leveled during subsequent passes. Moreover, it is known that excessive vibration input over too small a distance also contributes to the formation of corrugations. These relationships can thus be used to derive a target steering angle and/or a target vibration input. These may be related, for example, to a travel speed, a change in travel speed or the like of the ground compaction machine. For example, a target steering angle can specify a value for how much the operator should turn the steering until the roller comes to a standstill during reversing in order to arrange the resulting surface corrugation oblique to the working direction such that it can be optimally smoothened during subsequent passes. A target vibration input may, for example, specify a value for how high the maximum vibration input may be at which travel speed of the ground compaction machine. Specifically, such reference values for a target steering angle and/or a target vibration input are stored in a memory accessible to the control device. They may be fixed limit values. The reference values may, for example, be selective, for example in the sense of "only a maximum of Y vibration input if reaching or falling below a travel speed X", or they may be continuous, for example in the sense of characteristic diagrams that specify a wide range of travel speeds with associated maximum permissible vibration input. Moreover, the reference values may also comprise a computing rule from which the target steering angle and/or the target vibration input can be determined for a given travel speed and/or acceleration around reversing. Since the reversing of the ground compaction machine during operation typically always takes place in almost the same way, at least in comparable working situations, the reference values may alternatively also be related to a time interval and/or a distance before and/or after reversing instead of the travel speed. Such reference values could therefore, for example, specify information in the sense of "switch off the vibration exciter at the latest X seconds or Y meters before reversing" or "switch on the vibration exciter at the earliest X seconds or Y meters after reversing". By comparing the steering angle and/or the vibration input with the reference values for the target steering angle and/or the target vibration input, it is possible to determine the extent to which the steering angle or vibration input set by the operator of the ground compaction machine before, during and after reversing corresponds and/or has corresponded to the specifications for optimum evenness of the compacted ground. The result of the comparison/comparing may be purely qualitative or also quantitative. Thus, the result may, for example, consist in information on whether or not the steering angle and/or vibration input set by the operator corresponds to the reference values. In addition, the result may in particular also include by how much the steering angle and/or vibration input set by the operator deviates from the reference values. For example, the result may include information about how much smaller the steering angle set by the operator is than the target steering angle when reversing the ground compaction machine. Since a steering angle that is too narrow can also be detrimental to the evenness of the ground during reversing, the target steering angle may likewise be an interval, which thus specifies both a lower and an upper limit for the steering angle. Accordingly, the result may also include information on how much the steering angle set by the operator when reversing the ground compaction machine is greater than the upper limit set by the target steering angle. This is done in particular in addition to the monitoring of the lower limit already described. Additionally or alternatively, the result may also include information on how much the vibration input set by the operator around reversing is greater than the target vibration input. "Around reversing" as used herein means a reference to the interval and/or distance around the determined time of reversing and/or around the location of the ground compaction machine at that time. Overall, therefore, the result of the comparison comprises information on the extent to which the control performed by the operator of the ground compaction machine corresponds to an optimum control in terms of optimum evenness of the compacted ground.

Finally, the method according to the invention also comprises outputting and/or storing the result of the comparison/comparing. For example, the result may be output or displayed visibly on a display device for the operator of the ground compaction machine. Additionally or alternatively, an acoustic output is also possible, for example. In this way, the operator receives immediate feedback on whether or not his control of the ground compaction machine during the previous reversal was optimal with respect to the resulting evenness of the compacted ground. If necessary, the result also provides the operator with feedback on a degree to which his control of the ground compaction machine deviated from optimum control during the previous reversal. This information can be used by the operator to perform future reversing of the ground compaction machine more optimally. The result of the comparison according to the invention thus only provides the operator with information about the already completed last reversing sequence. However, this information can be positively used to improve each subsequent reversal, which overall realizes an assisted operating support for the ground compaction machine and overall improves the evenness of the ground after the compaction work is completed. Given the professional working environment, it can be expected that the operator will implement corresponding instructions wherever possible. Additionally or alternatively, the result may also be stored, for example in a memory of the control device. The operator can then, for example, view the result after completing the work operation and in this way receive feedback on the work process. Again, this can then be used for future work operations to improve the resulting evenness of the compacted ground. Furthermore, the stored results may be read out, for example by an operating entity of the ground compaction machine, which is not necessarily identical with the operator. This therefore provides the operator with feedback on the quality of his control of the ground compaction machine. This allows the operator to determine, for example, whether or not the operator needs additional driver training. This contributes in improving the evenness of the ground in future work operations. To further simplify this process, the ground compaction machine may, for example, have a device for remote data transmission and the result(s) of the comparison may be automatically transmitted to the operating entity, for example uploaded to a central server of the operating entity.

In principle, it would be sufficient if the detection of the parameters travel speed, change in travel speed and/or reversal of direction of travel as well as steering angle and/or vibration input or variables correlating with the mentioned parameters were repeated at discrete, in particular temporal and/or locational, intervals. As long as the discrete intervals are chosen narrow enough to determine the time of reversing of the ground compaction machine with sufficient accuracy, the method can be performed with such data. Preferably, however, the detection of at least one of the parameters travel speed, change in travel speed and/or reversal of direction of travel or at least one variable correlating with one of the mentioned parameters and/or the detection of the steering angle and/or the vibration input or a variable correlating therewith is performed continuously. In this way, the time of reversing can be determined particularly precisely. Moreover, it is possible to determine the values of the respective parameters particularly precisely, for example at a time when a certain travel speed is measured or a certain vibration input occurs.

As mentioned above, the focus of the method according to the invention is to optimize the control of the ground compaction machine around reversing. Accordingly, the interval and/or the distance can be determined such that only the control of the ground compaction machine in the immediate temporal and/or spatial vicinity of the reversal is considered. For example, the size of the interval or the distance can be defined separately for each individual case, for example based on functional criteria. Preferably, the interval or the distance can be set such that the beginning is specified by the travel speed of the ground compaction machine falling below a threshold value that signals that an operation with a working speed in one direction of travel is being terminated. The working speed describes a travel speed at which the ground compaction machine is typically operated in working operation while traveling straight ahead over a ground to be compacted. Such typical working speeds depend on the type of ground compaction machine and are known to the skilled person. Similarly, the end of the interval or distance may be specified by the travel speed of the ground compaction machine increasing above the threshold value, signaling that the machine is accelerating back to the working speed. The beginning and the end may be specified by the same threshold value or by different threshold values. The threshold value may be 3 km/h or 5 km/h or 7 km/h, for example. The working speed may be fixed and, for example, likewise correspond to the threshold value or be a fixed value, for example 1 km/h or 2 km/h or 3 km/h, above the threshold value. Preferably, the interval and/or the distance are set such that the reversal is in the middle of the interval and/or the distance. For example, the interval may be set to comprise a maximum of 20 seconds, preferably a maximum of 15 seconds or a maximum of 10 seconds, and more preferably a maximum of 5 seconds, before and/or after reversing. Additionally or alternatively, the distance may be set to comprise a maximum of 50 m, preferably a maximum of 40 m or a maximum of 30 m or a maximum of 20 m or a maximum of 10 m, and more preferably a maximum of 5 m, before and/or after reversing. In order to define the interval or the distance in this way, the time or the location of reversing must of course already have been determined. This means that at least for those parameters and variables that must be detected before reversing, past detected values must be used at the time when it is determined when reversing took place. Even though the method then only uses values lying within the considered interval or the considered distance, it is therefore still preferred that the values are detected over the entire working operation of the ground compaction machine. However, since not all of this data is required, it may be preferable, for example, to retain or store the data only until the time of the subsequent reversal has been determined. From this moment on, it is sufficient to keep only the data that are within the considered interval or distance. Previous data, on the other hand, can be deleted. Preferably, a type of rolling memory may also be used for this purpose, which always contains the most recently recorded data or values of the detected parameters. The rolling memory may be configured such that it is at least large enough to store the data from the part of the interval and/or distance before the reversal. Data that reaches back further, on the other hand, may be overwritten.

As already indicated, it is preferred that the reference values used for comparing comprise a target steering angle indicating how large the steering angle should at least be at the determined time of reversing. In other words, the target steering angle indicates how much the operator of the ground compaction machine should turn the steering before the ground compaction machine comes to a standstill during reversing. In this case, the direction of the steering angle is not important for the effect on the evenness of the compacted ground. It is therefore irrelevant whether the steering is turned to the left or to the right. This can therefore be freely selected depending on the conditions of the construction site. Therefore, for example, only the amount of the steering angle in deviation from straight-ahead travel is considered. Accordingly, the target steering angle also refers to the amount of the steering angle in deviation from straight-ahead travel. The target steering angle and/or the steering angle may in particular be defined as a deviation of the rolling direction of the ground compaction machine shortly before the standstill at the reversing point during reversing from the rolling direction at this reversing point during at least one preceding or subsequent pass during which the ground compaction machine does not perform reversing. In order to be able to assess this, position data is collected over the entire work sequence of the ground compaction machine, for example. The rolling direction in this case corresponds in particular to the current travel or working direction of the ground compaction machine. In this way, for example, it is also taken into account that the ground to be compacted may also lie in a curve. The steering angle then takes into account the deviation due to the turn-in from the curvature of the curve. Especially in cases where the ground to be compacted lies in a curve, it is furthermore preferred that the steering is turned against the direction of the curve. According to the invention, this may also be monitored and included in the rating. Moreover, the target steering angle may refer to the front and/or the rear roller drum and/or to an oblique orientation of the ground compaction machine. The target steering angle is, for example, at least 20°, preferably at least 25° or at least 30° or at least 35° or at least 40°, more preferably at least 45° or at least 50° or at least 55° or at least 60°.

The vibration input into the ground must be reduced or decreased in time before reversing. In particular, it must be prevented that the ground compaction machine still provides a significant vibration input into the ground when driving particularly slowly shortly before coming to a standstill. After reversing, the vibration input must not be increased again until the ground compaction machine has accelerated back to a sufficiently high travel speed. It is therefore preferred that the vibration input is reduced, in particular to zero, before reversing, and that the reference values used for comparison comprise a target vibration input indicating how large the maximum vibration input should be, in particular in relation to the travel speed of the ground compaction machine. Additionally or alternatively, it is preferred that the vibration input is increased, in particular starting from zero, after reversing, and that the reference values used for comparison comprise a target vibration input indicating how large the maximum vibration input should be, in particular in relation to the travel speed of the ground compaction machine. As already mentioned, the IPF value is preferably used as a measure of vibration input. Additionally or alternatively, the frequency, amplitude, eccentricity and/or provided vibration energy of the vibration exciter may be used. For example, the target vibration input may indicate from which travel speed of the ground compaction machine no more vibration input should be provided before reversing and/or from which travel speed of the ground compaction machine a vibration input should be provided again after reversing. For example, reducing the vibration input to zero while still maintaining a constant travel speed, such as the working speed, can be considered optimal. It should be noted, however, that the working speed is not necessarily always the same and may, for example, also be different before and after reversing. One advantage of the IPF value is that it relates the vibration input to the distance traveled and is therefore independent of the travel speed. Therefore, the target vibration input may comprise, for example, an IPF value as a limit value. Preferably, however, a slight deviation from this value is still considered optimal. For example, a deviation of no more than 20%, preferably no more than 15% or no more than 10% or no more than 5%, from the IPF value stored as the reference value for the target vibration input can still be considered optimal. This can be included accordingly in the comparing step(s) of the method and also in the rating.

As already mentioned, vibration exciters, especially circular exciters, inevitably pass through a resonant frequency when switched on and off, at which increased vibration amplitudes occur for a short time and therefore a higher vibration input into the ground also takes place. This therefore also leads to surface corrugations. The effect occurs especially when the vibration exciter is switched off, i.e., before the ground compaction machine is reversed. Therefore, in order to smoothen these waves as well as possible during reversing, according to an optimum control of the ground compaction machine, the created corrugations are passed over again already with as high a compaction performance as possible after reversing. This means that, in the best case, the corrugations should also be passed over with a high vibration input, for example the maximum intended working performance of the vibration exciter. When accelerating the ground compaction machine after reversing, the vibration exciter must therefore be switched back on earlier or closer to the reversing point than it was switched off before reversing. This may also be monitored by the method according to the invention and may be included in the rating explained in more detail below. For this purpose, it may be preferred that within the interval and/or the distance a position of the maximum vibration input before reversing is determined, and that the reference value for the target vibration input indicates a minimum vibration input with which this position is to be passed over after reversing. In particular, the position of maximum vibration input refers to the position at which the vibration exciter passes through its resonant frequency when the vibration input is reduced. This position can be determined, for example, via the travel speed, the change in travel speed or a location determination, for example via GNSS, as already described above. For example, the target vibration input may specify that this position should already be passed over with a nominal vibration input after reversing, for example the maximum compaction performance of the vibration exciter. In particular, the nominal vibration input refers to a vibration input at which the vibration exciter operates optimally at the given position of the ground to be compacted. This may, for example, be specified by an automatic system, such as applicant's "Asphalt Manager". Particularly preferably, the position of the maximum vibration input is determined separately for each roller drum of the ground compaction machine and considered individually as described above.

If the ground compaction machine has a front and a rear roller drum that are spaced apart in the longitudinal direction of the machine, it is also important for optimum control of the ground compaction machine that the rear roller drum as seen in the current direction of travel or working direction still passes over the position of the maximum vibration input of the front roller drum before reversing. As explained above, when the vibration input is reduced, the vibration exciter of the front rolling drum passes through its resonant frequency and in this case exhibits an increased vibration input, which leads to the formation of corrugations. These corrugations should therefore optimally be passed over by the rear roller drum before reversing, for which it is important that the vibration input is reduced in good time before reversing, for example that the vibration exciter is switched off in good time before reversing. In order to also take this into account in the method according to the invention, it is preferred that a position of maximum vibration input of a front roller drum of the ground compaction machine before reversing is determined within the interval and/or the distance, and that it is monitored whether a rear roller drum of the ground compaction machine passes this position before reversing. Whether or not this is successful, and if so to what degree, can then also be taken into account in the rating explained in more detail below.

The actual extent of the effect of the described control of the ground compaction machine performed by the operator on the evenness of the compacted ground also depends on external circumstances. These are referred to herein as operating conditions. For example, the consistency of an asphalt layer laid by a road paver depends largely on its temperature. The hotter the asphalt, the easier it is for undesired currogations to form, so that deviating from the reference values results in greater unevenness than with cooler asphalt. At the same time, the temperature of the asphalt is also influenced by external circumstances, such as the weather. Ground stiffness, which also depends on the properties of the ground beneath the asphalt, also has an influence here. Moreover, it makes a difference whether the ground to be compacted has a slope. For example, depending on the direction of travel, a slope can positively or negatively influence the effects of decelerating on an asphalt layer. It is therefore generally preferred that at least one external operating condition is also taken into account when comparing the detected values with the reference values, the operating condition comprising, for example, a ground temperature and/or a ground stiffness and/or weather conditions and/or a transverse and/or longitudinal slope of the ground. The external operating conditions may be detected by sensors, to which end the ground compaction machine is preferably equipped with one or more sensors that can detect the respective operating conditions. The measurement results of the sensors are forwarded accordingly to the control device, which can then take the external operating conditions into account for comparing. Additionally or alternatively, the external operating conditions may also be entered by the operator at the control device. Preferably, the control device adjusts the reference values based on the operating condition(s). For example, it may be necessary to apply stricter reference values if the ground temperature is particularly high. If, on the other hand, the ground temperature is particularly low, the reference values can be selected less strictly, since the influence of the driving maneuvers of the ground compaction machine on cool ground or asphalt is lower. The adjustment of the reference values based on the external operating conditions may likewise be done qualitatively or quantitatively. For example, the reference values may be increased or decreased by a fixed value if corresponding external operating conditions are present, such as particularly hot asphalt. Alternatively and preferably, the adjustment of the reference values may be gradually modified according to the external operating conditions. For example, the reference values for a certain initial value of the external operating conditions may be specified, e.g. ground temperature, outside temperature, amount of precipitation, slope angle, etc., and adapted to deviating external operating conditions using a computation rule. In this case, the reference values are dynamically and quantitatively adapted to the external operating conditions or the current conditions of the construction site.

Outputting the result of the comparison may comprise displaying it to the operator of the ground compaction machine. As explained above, this feedback allows the operator to adjust the ground compaction machine control for future reversing to achieve optimum results in terms of evenness of the compacted ground. Preferably, in the case where a deviation of the steering angle and/or the vibration input from the reference values has been detected within the interval and/or the distance, an instruction is displayed to the operator as to how the deviation can be reduced or avoided in the future. In addition to the result of the comparison, the operator is thus also provided with information on how he can specifically optimize the control of the ground compaction machine. This also applies to all other aspects of ground compaction machine control described herein that may be included in the rating. These may likewise be used to display indications to improve operator control of the ground compaction machine. Such indications may be, for example, "switch off vibration exciter earlier", "switch on vibration exciter later" or "turn steering more when reversing". It is also possible to display multiple such indications simultaneously if several deviations from the reference values were detected during the underlying reversal. These indications may, for example, be displayed visually, in particular in writing, on the display device. Additionally or alternatively, it is also possible to output the indications acoustically, for example via a voice output. In this way, the operator of the ground compaction machine is automatically assisted during operation, providing insights into the effects of ground compaction machine control on the evenness of the compacted ground that are typically only available to highly experienced operators. Even inexperienced operators can thus achieve increased evenness of the ground. Experienced operators, in turn, can further perfect their expertise.

To provide even more information to the operator, it may be preferred that an indication be displayed to the operator along with the instruction if an external operating condition has resulted in an adjustment of the reference value(s) that increases a deviation of the steering angle and/or vibration input within the interval and/or distance from the reference value(s). Accordingly, this becomes important whenever there are external operating conditions that increase the effects of the operator's driving behavior on the evenness of the ground. Such indications may therefore be, for example, "turn steering more when reversing due to high ground temperature", "turn steering more when reversing due to steep slope" or "switch off vibration exciters even earlier due to low ground stiffness". In this way, the operator is provided with additional expertise in addition to improving the current work result.

Generally, the result of the comparison can be output numerically. Thus, the specific numerical deviation of the detected steering angle and/or vibration input from the reference value(s) could be output. However, in order not to burden the operator with having to worry about how bad the indicated deviation really is in addition to all other duties he has to fulfill during operation, it is preferred that the result of the comparison is automatically evaluated. It is thus preferred that the result of the comparison is assigned a rating which decreases with a higher deviation from the reference value(s) or the optimum control of the ground compaction machine, and which is in particular also output or stored. For example, different levels could be defined to represent a spectrum from no deviation to minor deviation to high deviation. For example, a common grading system could be used here, for example in levels from 1 (excellent) to 6 (fail). Alternatively, fewer rating levels, such as three levels, would also be possible. These might be, for example, "no deviation", "minor deviation" and "high deviation". The respective limit values of the individual levels can either be fixed or adjustable by the operator or operating entity of the ground compaction machine. For example, it may be taken into account that different construction sites may have different requirements regarding the evenness of the compacted ground. To make reading the rating even easier for the operator, the rating may be displayed in the form of an icon, for example a pictogram or a smiley with a facial expression reflecting the rating.

In addition to the mentioned criteria, the method may also monitor other factors that may influence the evenness of the compacted ground. As already described, for reversing, the ground compaction machine must be slowed down and then accelerated again. Both decelerating and accelerating of the ground compaction machine should be as gentle as possible, i.e. without jerky or abrupt changes in travel speed. Such jerky changes in travel speed may also cause surface corrugations. It is therefore preferred that jerky changes in travel speed are also detected and included in the rating. In particular, jerky changes in travel speed are detected within the interval and/or within the distance. Such cases are characterized by a rapid increase in the amount of travel speed and/or acceleration, i.e. change in travel speed, of the ground compaction machine. Threshold values may also be provided for this purpose, which serve to detect jerky changes in travel speed. If such jerky changes are detected, this can be included in the rating and, in particular, also taken into account in the instruction. An indication is then displayed, for example, that decelerating or accelerating should be performed more gently.

Generally, an assisted operating support and an associated improvement in the evenness of the compacted ground can already be achieved if the method according to the invention is applied to only a single reversal of the ground compaction machine. The operator can then use the resulting feedback to optimize future reversing, if necessary. However, it is preferred that the method is carried out for multiple, in particular all, reversing operations within a work interval. In this way, the operator is assisted throughout and an optimal work result is achieved. A work interval describes, for example, an operator's working day or an operator's working time at a specific construction site. Generally, however, smaller work intervals could also be considered, for example one or more hours of a working day or work operation. In particular, the individual ratings of all reversing operations of the work interval may be used to create an overall rating, which is also output or stored. The overall rating may, for example, follow the same scheme as the rating of a single reversal. For example, a school grading system or the like may also be used here. For example, the overall rating may be a mean value of all ratings of the work interval. The overall rating can be used by the operator to determine if the ground compaction machine control he performed was appropriate for the current construction site and/or if his ground compaction machine control has improved or worsened. At the same time, an operating entity of the ground compaction machine can determine which operators, if any, need additional training.

The method described above thus preferably determines one or more of the mentioned parameters, identifies a reversing operation based thereon, for example by determining a reversal of direction of travel, then compares the actual reversing operation with respect to one or more of the mentioned parameters with an optimum reversing operation, for example by a comparison with one or more characteristic diagrams, formulae, etc., and uses this comparison to rate how close the reversing operation that actually took place comes to the theoretically optimum reversing operation in the manner described above. This rating result can then be displayed to the driver, for example, who in this way also receives an indication during ongoing driving operation as to how he can further optimize his driving in this operating situation.

The above-mentioned object is further achieved by a ground compaction machine, in particular a tandem roller or single-drum roller, with at least one roller drum and a control device, the ground compaction machine being configured to carry out the method. In particular, the control device is configured to carry out the method, of course with the exception of the method step of controlling the ground compaction machine by the operator. The ground compaction machine may be equipped in the same way as the generic ground compaction machine described above. All features, effects and advantages described for the method according to the invention also apply mutatis mutandis to the ground compaction machine according to the invention and vice versa. Merely to avoid repetitions, reference is made to the respective other explanations.

BRIEF DESCRIPTION OF THE DRAWINGS

The invention will be explained in more detail below by reference to the embodiment examples shown in the figures. In the schematic figures.

DETAILED DESCRIPTION

Like parts or functionally like parts are designated by like reference numerals in the figures. Recurring parts are not designated separately in each figure.

Figure 1:
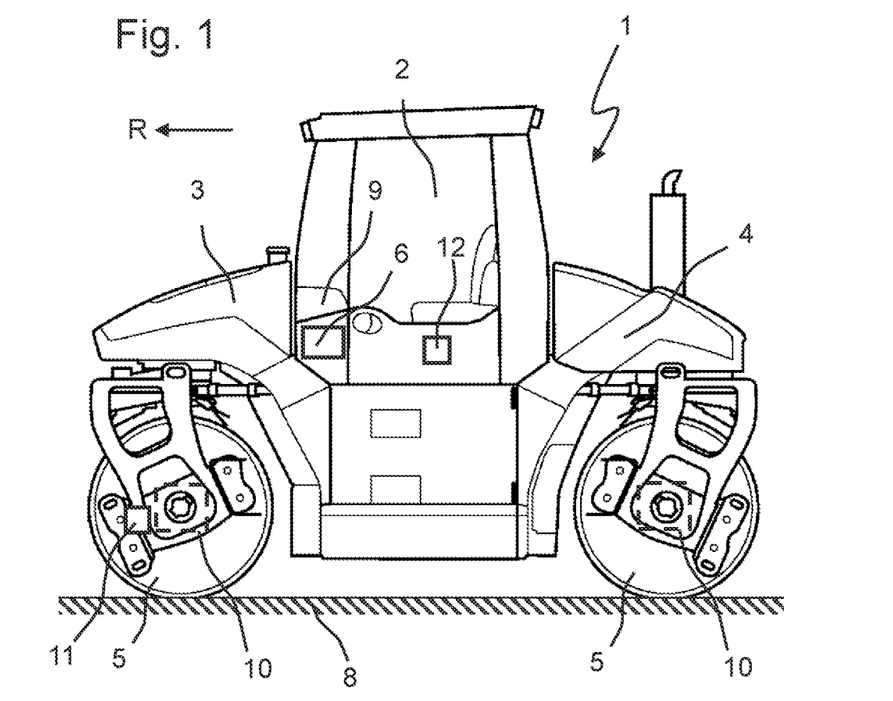
FIG. 1 is a side view of a tandem roller.
Figure 2:
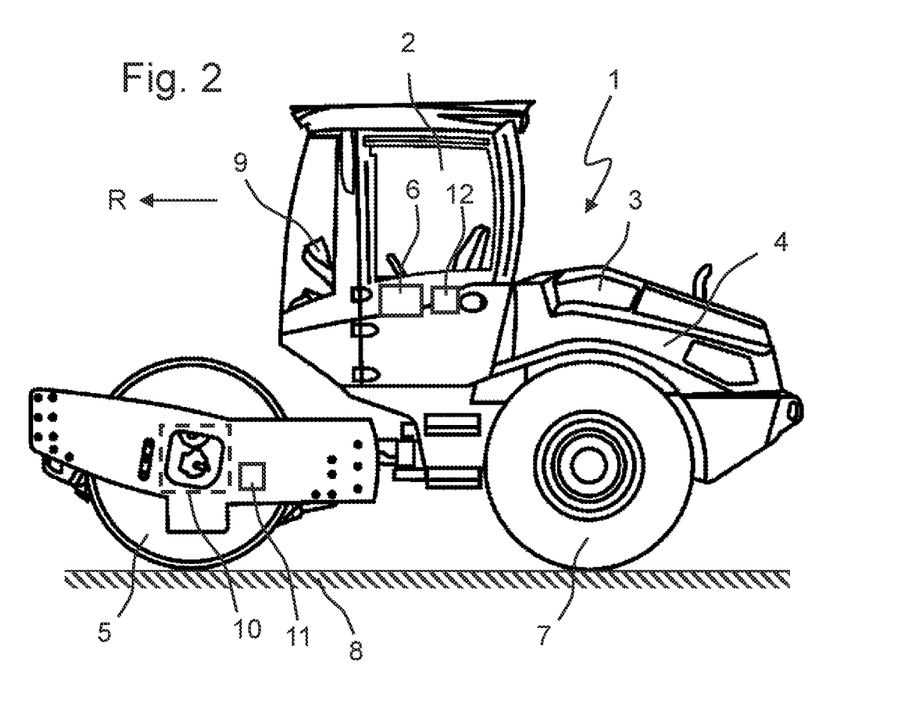
FIG. 2 is a side view of a single-drum roller.

FIGS. 1 and 2 show two ground compaction machines 1. More specifically, FIG. 1 shows a tandem roller and FIG. 2 a single-drum roller. The ground compaction machines 1 preferably include a machine frame 3 and an operator platform 2. The tandem roller according to FIG. 1 preferably has a front and a rear roller drum 5, while the single-drum roller according to FIG. 2 preferably has a front roller drum 5 and preferably wheels 7 on the rear carriage. In working operation, the ground compaction machines 1 preferably travel in or against the working direction R over the ground 8, for example an asphalt layer laid by a road paver, and compact it. For this purpose, they preferably have a drive motor 4, which may be an internal combustion engine or an electric motor, for example. The roller drums 5 may each be equipped with a vibration exciter 10 that sets the respective roller drum 5 into vibration to influence the compaction performance. The ground compaction machines 1 further preferably comprise a control device 6, which in particular executes the essential steps of the method. For this purpose, the control device 6 may also be connected to a display device 9, for example a display. Further, input devices, such as buttons, levers, etc., may be provided via which the driver of the ground compaction machine can make control commands, for example, with regard to travel speed, steering commands, settings for an exciter device, etc. In addition, the control device 6 may be connected to one or more sensors 11 of one or more detection devices, which are preferably configured to detect the travel speed and/or the change in travel speed and/or the reversal of direction of travel and/or the steering angle and/or the vibration input or variables correlating therewith. To be able to transmit the result of the comparison according to the invention also wirelessly, for example to a central server, the ground compaction machine 1 may further comprise a data transmission device 12, which may be configured, for example, to transmit data via the Internet or via another wireless data connection.

Figure 3:
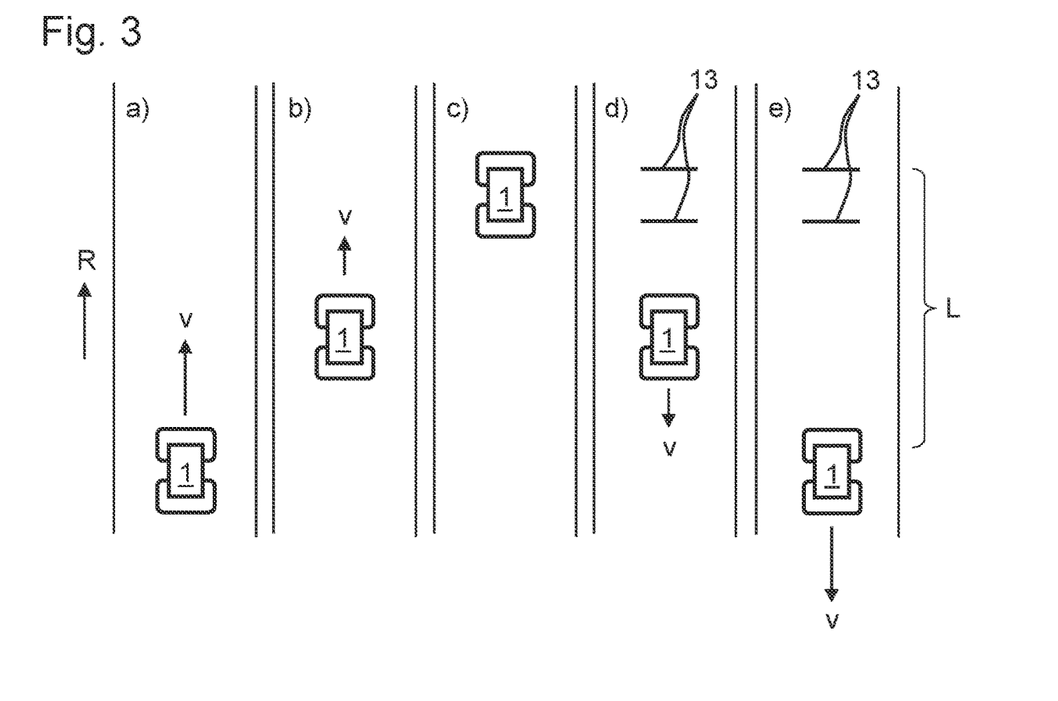
FIG. 3, and more particularly a) to e) thereof, shows the occurrence of surface corrugations when reversing without turning the steering.

FIG. 3 shows a reversal of the ground compaction machine 1. In particular, the diagrams a) to e) show the same ground compaction machine 1 on the same construction site section in top view from a bird's eye view, but in temporally successive snapshots. In diagram a), the ground compaction machine 1 travels at a travel speed v in the working direction R, the travel speed v in diagram a) corresponding to a working speed of the ground compaction machine 1 at which it typically compacts the ground 8. In diagram b), the ground compaction machine 1 has already been partially decelerated, so that the travel speed v is lower than that of diagram a). In diagram c), the ground compaction machine 1 has come to a standstill. The time shown in diagram c) is therefore the time of reversing or the reversal point of the ground compaction machine 1 when the machine starts up again in the opposite direction of travel, as shown in d). At the time of diagram d), in turn, the ground compaction machine 1 has already been accelerated in the opposite direction of travel, i.e., against the working direction R, and travels at a travel speed v an amount of which, however, is still below the working speed or the working speed to be achieved by the ground compaction machine 1. In the situation according to diagram e), the ground compaction machine 1 has been accelerated back to a travel speed v corresponding to the working speed. The distance L to which the method may refer, for example, may run through the distance of the reversing point of the ground compaction machine 1 to the place where the ground compaction machine 1 has again reached a travel speed v corresponding to the specified working speed. Alternatively, the distance L may also be specified by a distance, for example 30 m.

Figure 4:
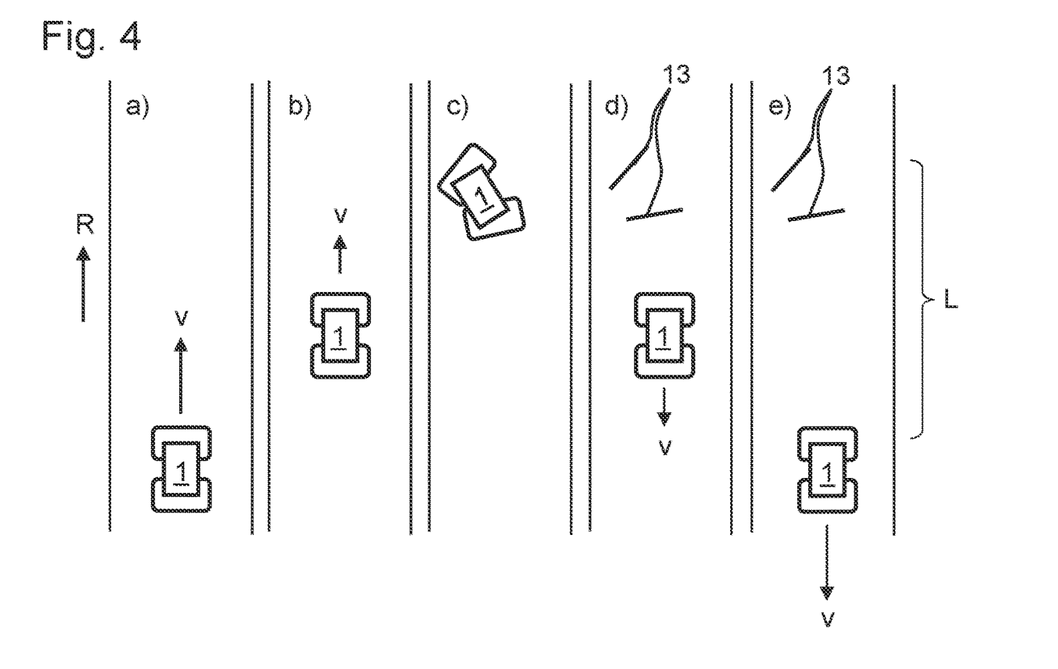
FIG. 4, and more particularly a) to e) thereof, shows the occurrence of oblique surface corrugations when reversing with turning the steering.

As shown in diagrams d) and e) of FIG. 3, the ground compaction machine 1 or its roller drums 5 each leave a surface corrugation 13 at the point of reversing or reversing point of the ground compaction machine 1. In the case of FIG. 3, these surface corrugations 13 are perpendicular to the working direction R, since no steering was performed during reversing. Such surface corrugations 13 are poorly smoothened during subsequent passes of the ground compaction machine 1. There is therefore an increased risk that the surface corrugations 13 will still have a negative effect on the evenness of the ground 8 at the end of the work. FIG. 4 shows the same process as FIG. 3. The only difference is that the operator of the ground compaction machine 1 in FIG. 4 turns the steering while reversing, as shown in particular in diagram c). As a result of turning the steering, the resulting corrugations 13 are no longer perpendicular to the working direction R with regard to the longitudinal extent of their trough, but are oblique to the working direction R. Such corrugations 13 are smoothened much more efficiently during subsequent passes of the ground compaction machine 1 than the corrugations 13 shown in FIG. 3, since they are passed over at an oblique angle. Overall, therefore, the approach according to FIG. 4 results in a significantly more even compacted ground 8.

Figure 5:
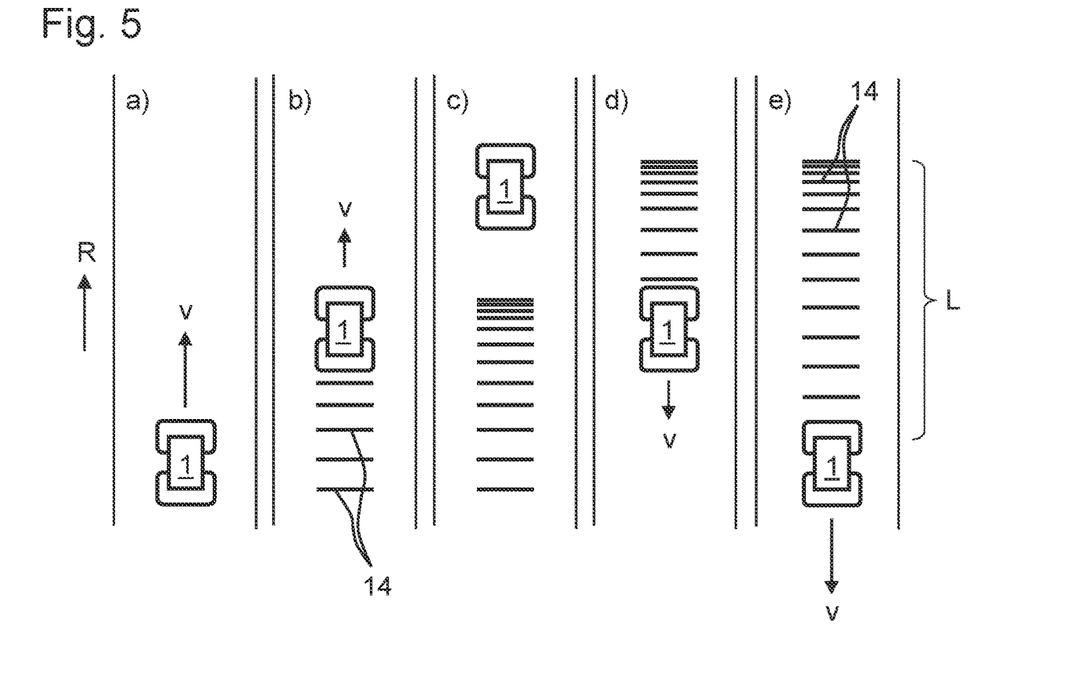
FIG. 5, and more particularly a) to e) thereof, shows the occurrence of surface corrugations due to too late reduction of the vibration input.
Figure 6:
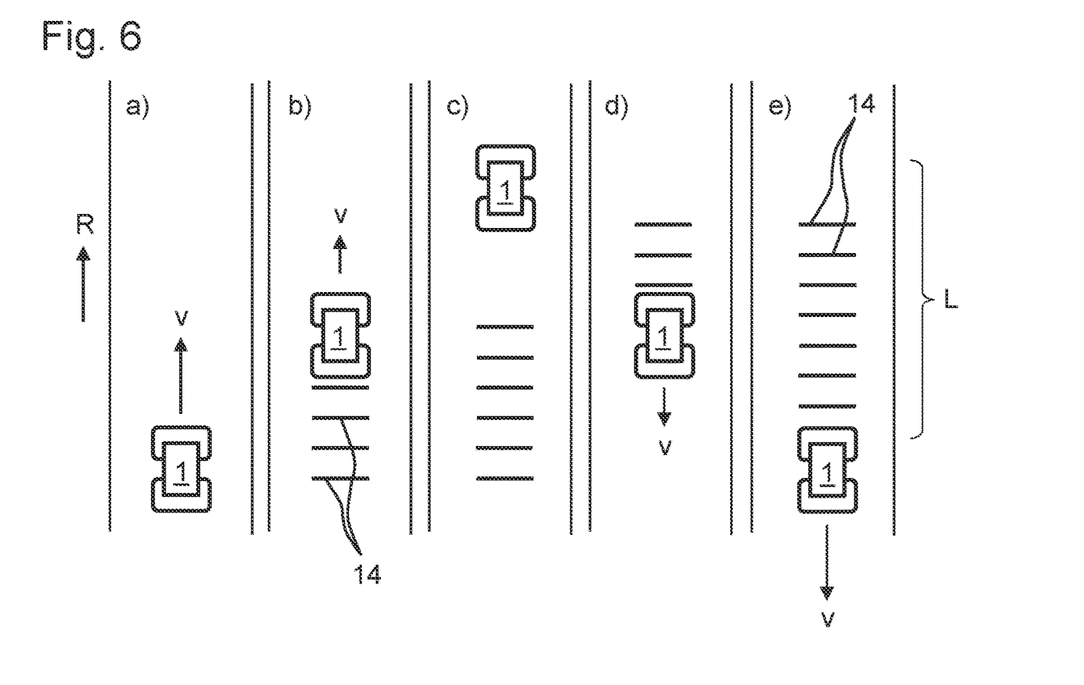
FIG. 6, and more particularly a) to e) thereof, shows the prevention of surface corrugations by early reduction of the vibration input.

FIGS. 5 and 6 show the sequence of a reversal of the ground compaction machine 1, analogous to FIGS. 3 and 4. FIGS. 5 and 6 show impacts 14 of vibrations of the rolling drums 5 on the ground 8. In this context, the impacts 14 may be referred to as impacts in the sense of an IPF value. For example, an impact 14 indicates a location where the vibration of the roller drum 5 pressed the latter against the ground 8. In other words, vibration energy is transferred to the ground 8 at the locations of the impacts 14. The distance between the impacts 14 is a measure of the vibration input, with impacts 14 shown closer to each other indicating a higher vibration input. It will be appreciated that FIGS. 5 and 6 are merely schematic diagrams intended to make the underlying operations comprehensible, but do not represent them in a realistic manner.

FIG. 5 shows two separate operator errors. In particular, diagrams a) to c) show the case where the vibration input into the ground 8 is reduced too late before reversing the ground compaction machine 1, for example to zero. Reducing the vibration input is achieved, for example, by switching off the vibration exciter 10 or the vibration of the roller drum 5. Reducing of the vibration input only takes place at a time when the ground compaction machine 1 has already been accelerated to a travel speed v that is so low that too many impacts 14 or too large a vibration input occurs over a short distance. This is shown by the closely spaced impacts 14 in diagram c). Where the impacts 14 are too close together or the vibration input is too high, surface corrugations can be formed that are detrimental to the evenness of the ground 8 left behind after the work. In contrast, in diagrams d) and e) the case is shown that the vibration input into the ground 8 is increased again, for example starting from zero, too soon after reversing the ground compaction machine 1. For this, for example, the vibration exciter 10 or the vibration of the roller drum 5 is switched on. In particular, the vibration input is increased at a time at which the ground compaction machine 1 has only been accelerated to a travel speed v that is too low, so that it may again occur that the impacts 14 are too close to each other at least over a partial distance or the vibration input is too high, which in turn can cause surface corrugations. This is also shown by the closely spaced impacts 14 in diagrams d) and e). In the worst case, the cases shown according to diagrams a) to c) and d) to e) occur together during a single reversal of the ground compaction machine 1. Of course, however, the two cases may also occur alone when the ground compaction machine 1 is reversed. If applicable, this will be taken into account in rating of the reversal.

FIG. 6 likewise shows the sequence of a reversal of the ground compaction machine 1. FIG. 6 shows in diagrams a) to c) that the ground compaction machine 1 decelerates for reversing, wherein in particular the vibration input is reduced in good time before standstill. For example, the vibration exciter 10 is switched off sufficiently early so that the decrease in travel speed v of the ground compaction machine 1 is compensated by a decrease in the vibration input, for example by a decrease in the frequency of the vibration exciter 10. The vibration input therefore decreases essentially at a same rate as the travel speed v, and there are no sections where the vibration input is too high, i.e., where there is excessive compaction. This is shown by the even spacing of the impacts 14. In this way, no or almost no significant surface corrugations are formed that are detrimental to the evenness of the compacted ground 8 at the end of working operation. In diagrams d) and e) of FIG. 6, the situation is shown in which the ground compaction machine 1 accelerates again after the reversal of direction of travel. In this case, however, the vibration input into the ground 8 is only increased again at a time at which the travel speed v of the ground compaction machine 1 is already sufficiently high, so that there are again no sections with excessive vibration input. To this end, for example, the vibration exciter 10 is only switched on again after the ground compaction machine 1 has reached a sufficiently high travel speed v. In this way, the formation of surface corrugations is prevented, which is shown by the even spacing of the impacts 14. FIG. 6 therefore shows a reversal in which optimum control is achieved both before and after the reversing point. As already explained, however, errors may also occur separately before or after the reversing point, which is taken into account accordingly in the rating.

Particularly preferably, the processes optimized in FIGS. 4 and 6 are also combined, i.e. oblique steering, as shown in FIG. 4, and sufficiently early and late switching off and on of the vibration exciters, as shown in FIG. 6, are preferably performed.

Figure 7:
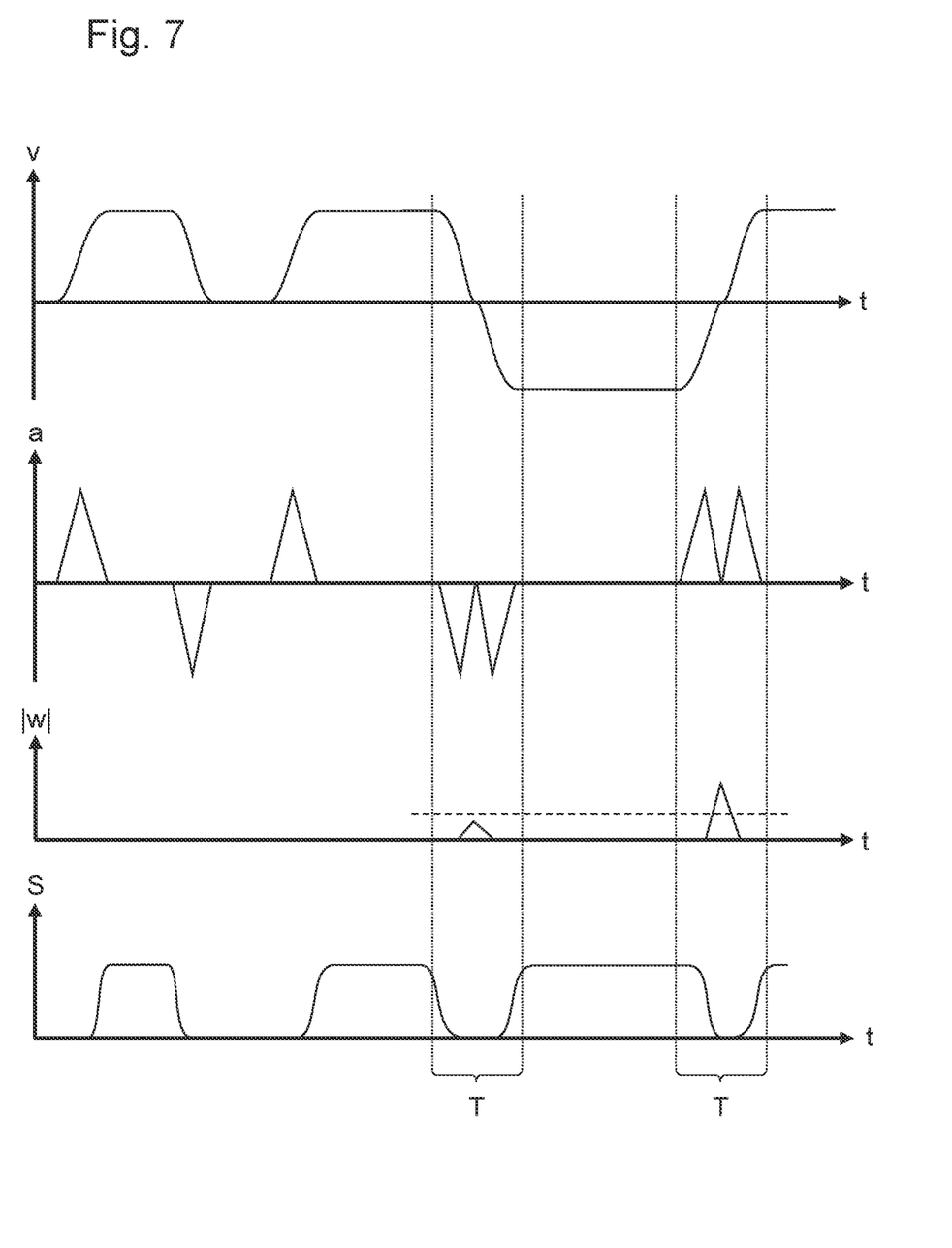
FIG. 7 shows the development of various parameters during reversing.

FIG. 7 shows the temporal relationship between the travel speed v, the change in travel speed a and the steering angle w and the vibration input S of the ground compaction machine 1. For this purpose, diagrams are shown one above the other for these respective values, the abscissa of which indicates the time t in each case, which is synchronized across all diagrams of FIG. 7. The corresponding values of the mentioned parameters are plotted on the ordinate of the respective diagrams.

For example, the top diagram of FIG. 7 shows the travel speed v of the ground compaction machine 1. From left to right, it is shown that the ground compaction machine 1 is accelerated from standstill until it reaches a constant travel speed v, for example the working speed. After the ground compaction machine 1 has traveled a distance at this travel speed v, it is decelerated back to a standstill. It is then accelerated again in the same direction as before until it has reached a constant travel speed v again. This process therefore includes braking and subsequent accelerating of the ground compaction machine 1 without a change in the direction of travel. Although this process may likewise influence the evenness of the ground 8 after the work, it does not involve reversing the ground compaction machine 1, which is what is particularly important in the present case. After a distance at a constant travel speed v, the ground compaction machine 1 is again decelerated to a standstill, but then accelerated in the opposite direction, for example, back to the working speed, but in the opposite direction. In other words, a reversal of the ground compaction machine 1 has been performed in this case. The time interval around reversing is referred to as interval T. This interval may have a fixed amount, for example, or may alternatively be determined by, for example, when the ground compaction machine 1 was decelerated from the working speed before reversing and accelerated back to the working speed after reversing. In the further course, the ground compaction machine 1 travels at an essentially constant travel speed v, for example the working speed, and is then reversed again. The ground compaction machine 1 is thus decelerated again to a standstill and then accelerated in the opposite direction. This reversal also takes place within a time interval T. This second interval T may generally be as large as the first interval T. However, it is also conceivable that the intervals T are of different sizes, for example in particular if these are determined functionally, for example based on a value of the travel speed v. In addition, it is also apparent from the diagram of the travel speed v how a reversal of the ground compaction machine 1 can be inferred based on the travel speed v or a reversal of direction of travel. This can be seen in particular from a reversal of the sign of the travel speed v.

Directly below the diagram of the travel speed v, FIG. 7 shows a diagram of the acceleration or the change in travel speed a of the ground compaction machine 1. As shown, the change in travel speed a may likewise be used to identify a reversal of the ground compaction machine 1. In particular, the reversing results in a twofold change in travel speed a in the same direction, separated by the standstill of the machine, from which reversing can be concluded. As can be seen from the left part of the diagram, such a double, equidirectional change in travel speed a does not exist in the case of interrupted straight-ahead travel in one direction.

Below the diagram of the change in travel speed a, FIG. 7 shows a diagram of the steering angle w. Since the direction of steering during reversing is not important, at least with respect to the evenness of the ground 8 after working operation, only the amount of the steering angle w is shown. Moreover, the diagram only shows steering angles w that correspond to steering turns during reversing within the intervals T. Other steering angles w occurring during the travel of the ground compaction machine 1 are not shown. In particular, the diagram shows that the steering angle w in the first interval T, shown on the left, remains below a threshold value represented by the dashed line parallel to the abscissa. This means that the operator has not turned the steering sufficiently during this reversal of the ground compaction machine 1, so that the surface corrugations 13 created at the reversing point are not sufficiently oblique to the working direction R to be smoothened out optimally in subsequent passes of the ground compaction machine 1. In other words, there is a deviation from a reference value given, for example, by the indicated threshold value. The corresponding deviation may be determined quantitatively and is included in a corresponding rating of the reversal of the ground compaction machine 1 by the operator. The situation of reversing in the first interval T shown on the left therefore corresponds to that shown in FIG. 3. In contrast, the diagram shows that the steering angle w in the second interval T, shown on the right, is above the threshold value represented by the dashed line parallel to the abscissa. Here, the operator has thus turned the steering sufficiently far when reversing the ground compaction machine 1, which results in the surface corrugations 13 created at the reversing point being oblique to the working direction R in such a way that they can be optimally smoothened during subsequent passes of the ground compaction machine 1. In this way, therefore, the overall evenness of the compacted ground 8 left by the ground compaction machine 1 is positively influenced. The situation of reversing in the second interval T shown on the right therefore corresponds to that shown in FIG. 4.

The bottommost diagram shown in FIG. 7 relates to the vibration input S. In order to avoid excessive compaction of the ground 8 at a given point, which would lead to the formation of corrugations, during working operation of the ground compaction machine 1 the vibration input S is only increased, or the vibration exciter 10 is only operated with a transfer of energy to the ground 8, when the ground compaction machine 1 is traveling at a sufficient travel speed v. This is also shown, for example, on the left of the diagram for the paused forward travel of the ground compaction machine 1. Here, too, however, the reversal of the ground compaction machine 1 has a special significance as it occurs particularly frequently during working operation of the ground compaction machine 1. As shown in the intervals T around the reversal of the ground compaction machine 1, the vibration input S is reduced, in particular to zero, before the machine comes to a standstill. After the reversal of direction of travel, the vibration input S is then typically increased again. However, it is also possible that a vibration input S is used or provided only before or only after reversing. Even then, the method can be applied to reducing the vibration input S before reversing or to increasing the vibration input S after reversing. In particular, the diagram in the first interval T shown on the left shows that the vibration input S is reduced early before reversing, so that the travel speed v is sufficiently high as long as there is still a vibration input S. In addition, the vibration input S is not increased until the ground compaction machine 1 has reached a sufficient travel speed v again. This means that there are no sections in which excessive compaction of the ground 8 takes place or in which there is excessive vibration input S. The control of the ground compaction machine 1 in this interval T is therefore optimal with respect to the evenness of the ground 8 produced. The situation therefore corresponds to that of FIG. 6. Moreover, the diagram shows in the second interval T shown on the right that the vibration input S is reduced too late before the machine comes to a standstill during reversing. The vibration input S is still at a maximum when the travel speed v of the ground compaction machine 1 has already decreased to an extent that causes the ground 8 passed over by the ground compaction machine 1 to be excessively compacted. In this case, therefore, surface corrugations are formed, which negatively affect the evenness of the ground 8 produced. After the reversing point, on the other hand, the increase of the vibration input S corresponds to that of the previous interval T, so that the vibration input S is not increased until the travel speed v of the ground compaction machine 1 is already sufficiently high. The situation shown in the second interval T shown on the right is thus composed of situations corresponding to the diagrams a) to c) of FIG. 5 and diagrams d) and e) of FIG. 6.

Figure 8:
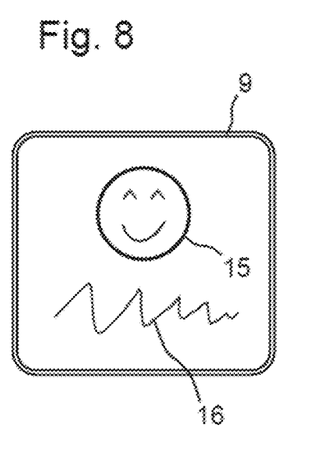
FIG. 8 shows output of a positive rating and an instruction.
Figure 9:
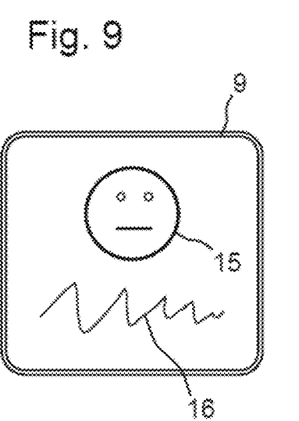
FIG. 9 shows output of a medium rating and an instruction.
Figure 10:
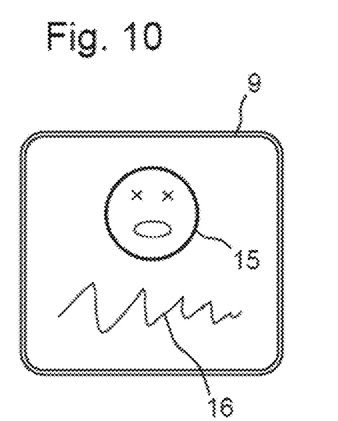
FIG. 10 shows the output of a bad rating and an instruction.

FIGS. 8, 9 and 10 show examples of how a display of the result of the comparison could look in connection with the output at the display device 9. The display device 9 may be, for example, a screen or display which is connected to the control device 6. The result of the comparison may be output, for example, via a rating symbol 15 symbolizing the rating determined by the comparison. In the example shown, the evaluation symbol 15 is a smiley which, depending on the result of the comparison or the quality of the rating, represents, for example, compliance with the reference values (FIG. 8), a minor deviation from the reference values (FIG. 9) or a significant deviation from the reference values (FIG. 10). In this way, an operator can immediately see at a glance whether or not the control of the ground compaction machine 1 has complied with the specifications during the past reversal. If necessary, he can adjust the control of the ground compaction machine 1 for future reversing. In order to assist or support the operator during operation, an instruction 16, for example in written form, may also be output on the display device 9 in addition to the rating symbol 15. Alternatively, the instruction 16 could also be output acoustically. The instruction 16 preferably comprises specific information on which reference values were not observed during the last reversal and/or how the deviation from the reference values can be avoided or at least reduced during future reversals.

Figure 11:
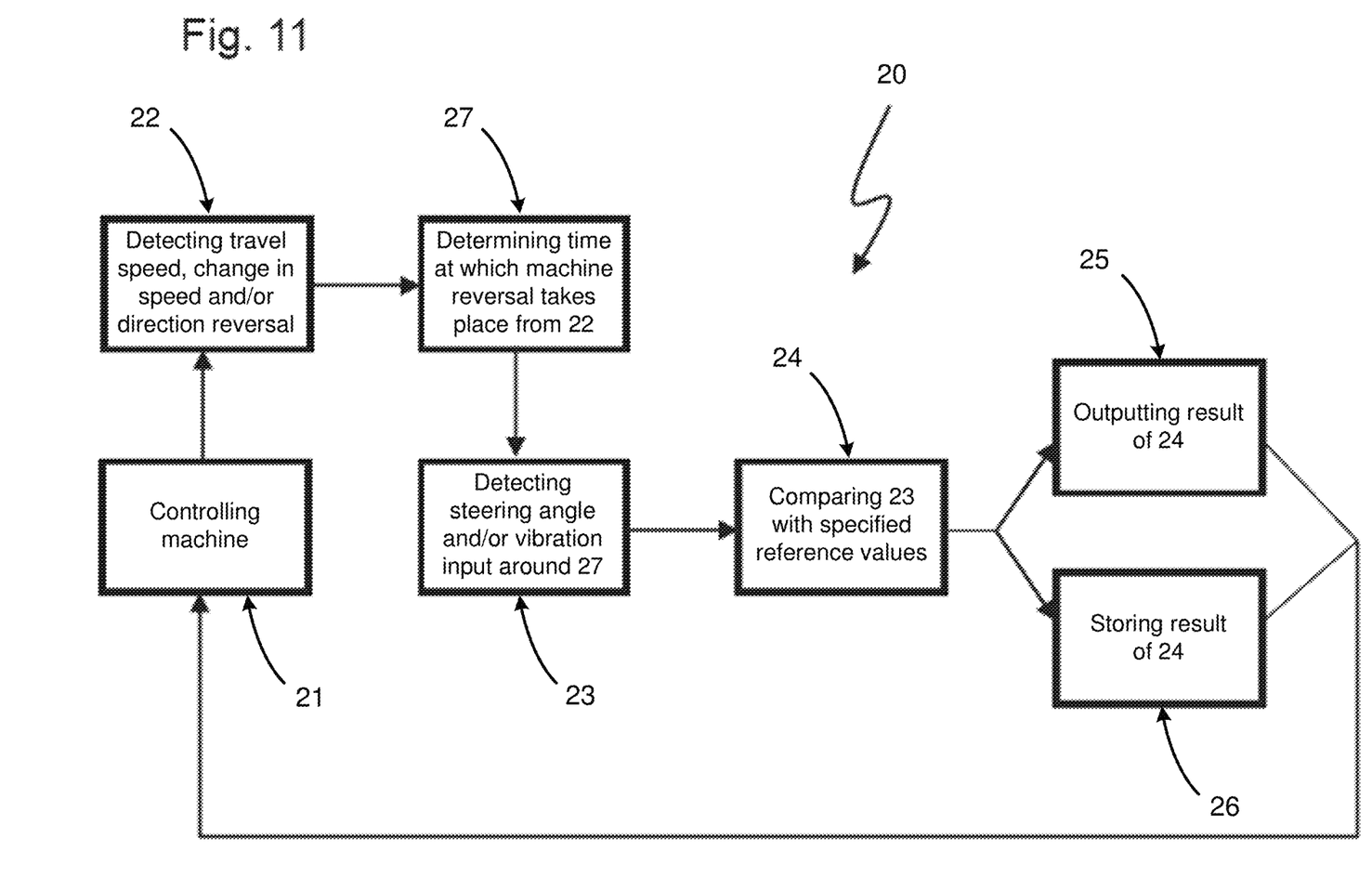
FIG. 11 is a flow chart of the method.

FIG. 11 finally shows a flowchart of the method 20. The method begins with an operator controlling 21 the ground compaction machine 1. The operator operates the ground compaction machine 1 on a construction site to compact a ground 8. Typically, several passes of the ground compaction machine 1 are required to compact the ground 8. Repeated reversing of the ground compaction machine 1 is therefore performed, and the manner in which the operator controls the ground compaction machine 1 during reversing has an increased influence on the resulting evenness of the ground 8. For this reason, the method 20 includes detecting 22 at least one of the parameters travel speed v, change in travel speed a, and/or reversal of direction of travel, or at least one variable correlating with one of the mentioned parameters. Such parameters are often already recorded on ground compaction machines 1 anyway, so that sensors 11 required for this purpose may already be available in some cases. A next step includes determining 27 a time at which a reversal of the ground compaction machine 1 takes place from the at least one detected parameter or the at least one detected variable. Through this, preferably also the location of the ground compaction machine 1 is detected at this time, if a position or path detection is performed. By determining when a reversal of the ground compaction machine 1 occurs, the operator's control of the ground compaction machine 1 around the reversal can be checked. For this purpose, detecting 23 a steering angle w of the ground compaction machine 1 and/or a vibration input S of a vibration exciter 10 into the ground 8, or a variable correlating with the steering angle w or with the vibration input S, within a time interval T and/or a distance L around the determined time of reversing and/or around a location of the ground compaction machine 1 at this time is performed. Recommendations exist for the steering angle w at the time of reversing as well as for the vibration input S around the reversal, which are intended to ensure optimum evenness of the ground 8 after the work process. Whether the recommendations are complied with is determined by comparing 24 the detected steering angle w and/or vibration input S within the interval T and/or the distance L with specified reference values for a target steering angle and/or a target vibration input. In particular, it can be directly inferred from this whether or not the operator is complying with the recommendations when controlling the ground compaction machine 1. In addition, it is also possible to determine quantitatively the extent to which the recommendations are not being complied with, if applicable. In order to obtain assisted operating support or assistance for the operator from this, outputting 25 and/or storing 26 the result of the comparison 24 are performed. The operator and, if applicable, an operating entity of the ground compaction machine 1 therefore receive overall feedback on the extent to which the control of the ground compaction machine 1 during reversing complies with the recommendations for optimum evenness of the compacted ground 8. Therefore, the operator can adjust the way he controls the ground compaction machine 1 in the future and improve his work results. The operating entity, in turn, can determine the extent to which an operator needs training. All in all, therefore, the method 20 according to the invention makes it possible to improve the evenness of the compacted ground 8 without having to detect this evenness itself using sensors.

What is claimed is:

1. A method for assisted operating support for a ground compaction machine, comprising the steps of:
   a) controlling the ground compaction machine by an operator;
   b) detecting a change in travel speed;
   c) determining a time at which a reversal of the ground compaction machine takes place from the change in travel speed detected in step b);
   d) detecting a steering angle of the ground compaction machine within a time interval around the time determined in step c);
   e) comparing the steering angle as detected in step d) with predetermined reference values for a target steering angle;
   f) outputting a result of the comparison.

2. The method according to claim 1, wherein detecting in steps b) and/or d) is performed continuously.

3. The method according to claim 1, wherein the interval is set such that the reversal is in the middle of the interval.

4. The method according to claim 1, wherein the predetermined reference values used for comparing in step e) comprise a target steering angle indicating how large the steering angle should at least be at the time of the reversal as determined in step c).

5. The method according to claim 1, wherein:
   reducing a vibration input is performed before the reversal, and that the predetermined reference values used for comparing in step e) comprise a target vibration input indicating how large a maximum vibration input should be in relation to the travel speed of the ground compaction machine, and
   increasing the vibration input is performed after reversing, and that the predetermined reference values used for comparing in step e) comprise a target vibration input indicating how large the maximum vibration input should be in relation to the travel speed of the ground compaction machine.

6. The method according to claim 1, wherein that within the interval a position of a maximum vibration input before reversing is determined, and that the reference value for the target vibration input indicates a minimum vibration input with which this position is to be passed over after reversing.

7. The method according to claim 1, wherein that within the interval a position of a maximum vibration input of a front roller drum of the ground compaction machine before reversing is determined, and that it is monitored whether a rear roller drum of the ground compaction machine passes over this position before reversing.

8. The method according to claim 1, wherein in step e), at least one external operating condition is additionally taken into account, and wherein the predetermined reference values are adapted based on the operating condition.

9. The method according to claim 1, wherein outputting the result of the comparison in step f) comprises displaying to the operator of the ground compaction machine, wherein in a case where a deviation of the steering angle within the time interval from the predetermined reference values has been detected, an instruction is displayed to the operator as to how the deviation can be reduced or avoided in the future.

10. The method according to claim 8, wherein an indication is displayed to the operator along with the instruction if an external operating condition has resulted in an adjustment of the reference values which increases a deviation of the steering angle within the interval from the predetermined reference values.

11. The method claim 1, wherein in step e), the result of the comparison is assigned a rating which becomes worse with a higher deviation from the predetermined reference values, and which is also output in step f).

12. The method according to claim 11, wherein abrupt changes in travel speed are also detected and included in the rating.

13. The method according to claim 11, wherein the method is carried out for all reversing operations within a work interval, wherein the individual ratings from step e) are used to create an overall rating, which is likewise output in step f).

14. The ground compaction machine with at least one roller drum and a control device, wherein the ground compaction machine is configured to carry out the method, and the control device is configured to carry out steps b) to f) of the method, according to claim 1.

* * * * *